United States Patent

Hodder

[15] 3,641,468

[45] Feb. 8, 1972

[54] TIME-MODULATING APPARATUS

[72] Inventor: Wayne K. Hodder, Glendora, Calif.

[73] Assignee: Bell & Howell Company, Chicago, Ill.

[22] Filed: Feb. 9, 1970

[21] Appl. No.: 9,776

[52] U.S. Cl. ....................332/9, 325/41, 325/46, 325/65, 332/18

[51] Int. Cl. ....................H03c 3/08

[58] Field of Search ....................332/9, 9 T, 18, 11, 11 D; 325/41, 42, 44, 45, 46, 65; 340/174.1 B

[56] References Cited

UNITED STATES PATENTS 3,249,870 5/1966 Greefkes ....................325/42 X
2,717,956 9/1955 Eglin ....................325/65
2,776,410 1/1957 Guanella ....................325/65 X
3,430,145 2/1969 Lord ....................325/42
3,486,117 12/1969 Groves et al. ....................325/42 X

*Primary Examiner*—Alfred L. Brody
*Attorney*—Luc P. Benoit

[57] ABSTRACT

An apparatus with error signal precorrection for time-modulating an information signal, which upon demodulation tends to be accompanied by an unwanted component, comprises a time modulator and auxiliary circuits. The auxiliary circuits include a network for providing an error signal having a frequency equal to the difference between the average sampling frequency of the time-modulation and the frequency of the unwanted component, and a network for combining the error signal with the information and for applying these combined signals to the time modulator for simultaneous modulation, whereby the error signal precorrects the information signal for the above mentioned unwanted component.

12 Claims, 4 Drawing Figures

INVENTOR.
WAYNE K. HODDER

BY [signature]
ATTORNEY.

INVENTOR.
WAYNE K. HODDER
BY [signature]
ATTORNEY.

TIME-MODULATING APPARATUS

BACKGROUND OF THE INVENTION

1. Field of the Invention

The subject invention relates to signal modulation and, more particularly, to apparatus for time-modulating information signals and precorrecting the modulating signal for unwanted modulation-demodulation components.

2. Description of the Prior Act

In time modulation systems, such as frequency modulation, phase modulation, period modulation, pulse duration modulation, pulse position modulation, pulse interval modulation of the type disclosed in my U.S. Pat. No. 3,319,013, "Apparatus for Recording High Frequency Signals on Magnetic Tape," issued May 9, 1967, to the assignee of the present application, and in other time modulation systems, the change in time relationship of a periodic signal is varied according to the changes in amplitude of an information signal. Modulation and demodulation of the information signal are accomplished in various ways which depend upon the particular type of time modulation involved. It is, however, characteristic of time modulation/demodulation systems in general that frequency components are present in the demodulated signal which were not present in the original information signal. Some of these frequency components are outside the frequency band of the information signal and are thus easily removed by suitable filter means which only pass the frequencies in the information band.

However, other frequency components which fall within the information frequency band cannot be removed and thus cause a serious problem, particularly in broadband modulation systems where the frequency range of the information signal extends in proximity to the carrier frequency. In these systems, lower sideband components produced in the modulation/demodulation process fall within the frequency range of the information signal.

The problems thus presented are particularly pressing in the field of video tape recording where factors such as the limited available bandwidth make the employment of a time modulation system in which the information frequency band extends in proximity to the carrier frequency mandatory.

In my U.S. Pat. No. 3,271,689, "Demodulator for Time Modulated Signals," issued Sept. 6, 1966, to the assignee of the subject patent application, I have disclosed and covered a demodulator circuit for time modulated information signals in which a nonlinear network with accompanying filter means is driven by the demodulated information signal to produce error signals that are employed to correct the unwanted frequency components under consideration. While this patented demodulator circuit presents a material progress over the prior art and is of high utility in many applications, I have more recently discovered and developed yet more advantageous apparatus for successfully dealing with the problem under consideration.

SUMMARY OF THE INVENTION

From one aspect thereof, the present invention provides apparatus for time-modulating at an average sampling rate of $f_s$ an information signal which upon demodulation tends to be accompanied by an unwanted component of a frequency of $f_x$. According to the subject invention this apparatus comprises first means for providing an error signal having a frequency $f_s$ minus $f_x$, and second means connected to these first means for combining the error signal provided by the first means with the information signal. Also according to the subject invention, these first and second means are combined with third means that are connected to the second means for time-modulating the combined error and information signals at said sampling rate whereby the error signal precorrects the unwanted component.

As this description proceeds, it will be noted that the subject invention uses to advantage the very sideband-generation function that is inherent in the modulation-demodulation process and that led to the unwanted components reduced or eliminated by operation of the subject invention. In other words, the subject invention corrects errors by exploitation of the same mechanism that gave rise to these errors, whereby the errors are precorrected before they can occur. By way of contrast, the demodulator system of my above-mentioned U.S. Pat. No. 3,271,689 generates sideband components which correspond to the unwanted sideband components occurring in the modulation-demodulation process, and utilizes these generated sideband components for eliminating the unwanted sideband components after they have occurred.

On the basis of conventional modulation theory, the apparatus of the subject invention would be considered unsuitable for solving the above-mentioned problem. As is, for instance, apparent from Black, MODULATION THEORY (Van Nostrand Co., 1953), page 37, it is a basic theorem of the sampling principle that the sampling rate should be at least slightly higher than twice the highest significant modulating signal frequency. Pursuant to this theorem, the frequency of modulating signals has always been kept below half the sampling rate in time-modulation communication systems.

In contrast to this well-established practice, the apparatus of the subject invention apply error signals as modulating signals to the time modulator at frequencies which may be, and which typically are, above half the sampling rate. This is easily seen if it is assumed that the frequency $f_x$ of the above-mentioned unwanted component is within the range of the information signal below one-half of the sampling rate so that it cannot be removed by filtering. If $f_x$ is thus below one-half the sampling rate, the frequency of $f_s$ minus $f_x$ of the error signal produced by the first means and applied through the second means to the time modulator must be above one-half the sampling rate. This is indeed the case, particularly in a preferred embodiment of the subject invention in which the above-mentioned first means include means for limiting the error signal of $f_s$ minus $f_x$ to frequencies above one-half of the average sampling rate of $f_s$ for a precorrection of unwanted components below one-half of the average sampling rate or within the frequency range of the information signal.

Contrary to established theory I have found that a violation of the traditional interpretation of the above-mentioned theorem in effect yields highly advantageous precorrection systems, as will become more fully apparent as this description proceeds.

The modulator system according to the subject invention has the material advantage over my previously patented demodulator system that the unwanted components are precorrected at the modulator and do thus not occur in the demodulator where they otherwise would engender second-order effects, such as intermodulation distortions. Also, material savings are realized if unwanted components are precorrected at the modulator, rather than post-corrected at the demodulator, in systems in which video programs are recorded on tape at a master station and are subsequently distributed to subscribers or customers for playback on individual tape playback machines. In these systems the saving manifests itself in the difference between the cost of a single correction system at the master station and the cost of a multitude of correction systems at the various customer-operated playback machines.

Even if the individual customers are equipped with machines for both recording and playback, the sale of video tapes that have been prerecorded by a supplier is still promoted by a superior display of the video programs accomplished through a precorrection of the unwanted components under consideration at the modulator circuit of the master recording machine employed by the prerecording supplier.

From another aspect thereof, the subject invention resides in apparatus for time-modulating at an average sampling rate of $f_s$ an information signal having a frequency of $f_m$ which upon demodulation tends to be accompanied by unwanted components of frequencies equal to $f_s - nf_m$, where $n$ represents integers greater than one. According to this aspect of the subject invention, the apparatus under consideration includes first means for providing error signals having frequencies equal to $nf_m$, and second means connected to the first means for combining these error signals with the information signal. Again according to principles of the subject invention, the first and second means just defined are combined with third means connected to the second means for time-modulating the combined error and information signals at said sampling rate whereby the error signals precorrect the named unwanted components.

BRIEF DESCRIPTION OF THE DRAWINGS

The invention and its various aspects will become more readily apparent from the following detailed description of preferred embodiments thereof, illustrated by way of example in the accompanying drawings, in which.

DESCRIPTION OF PREFERRED EMBODIMENTS

Figures 1, 2:
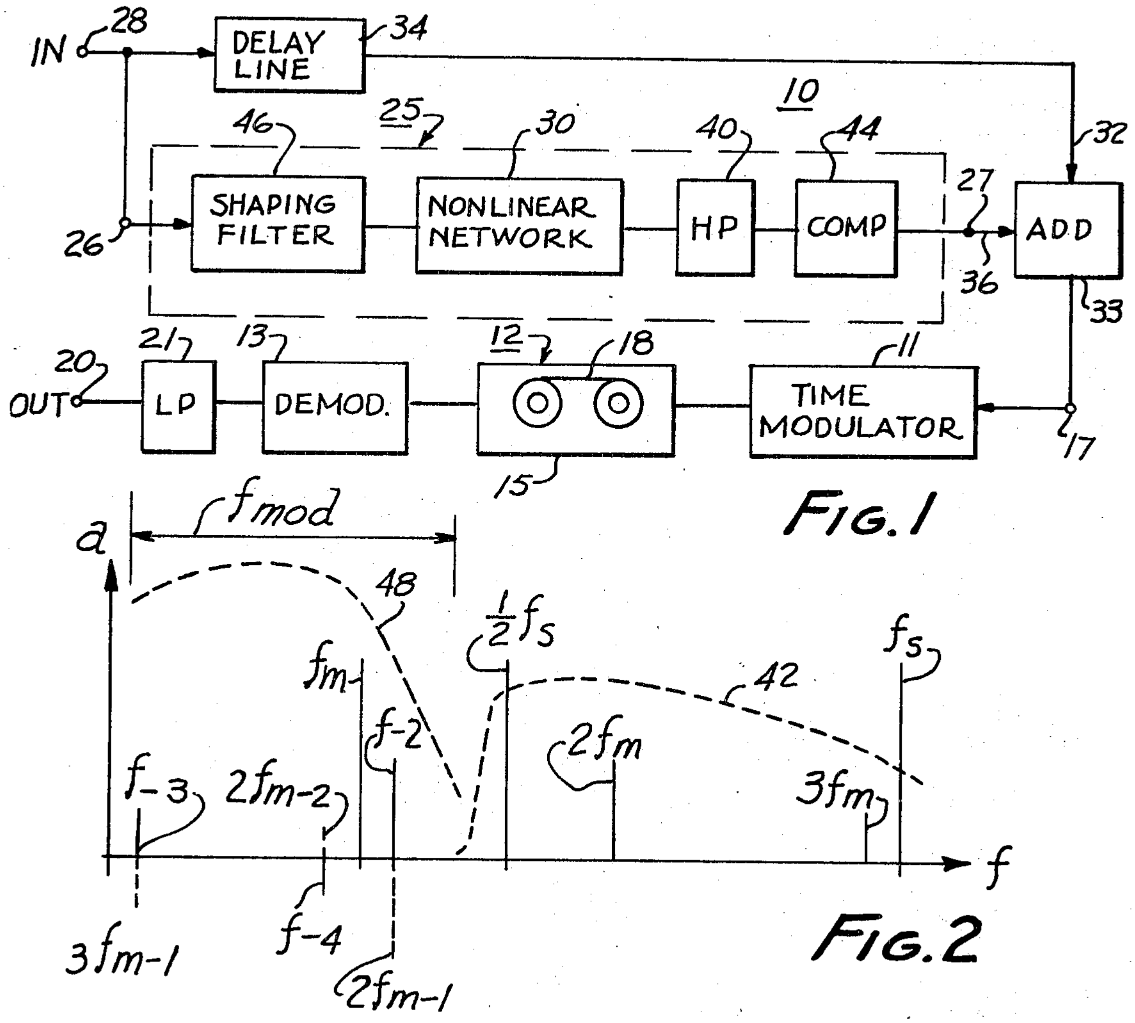
FIG. 1 is a block diagram of a time modulation system in accordance with a first preferred embodiment of the subject invention.
FIG. 2 is an amplitude-versus-frequency plot illustrating the operation of the apparatus of FIG. 1.

The time modulating system 10 of FIG. 1 includes a time modulator 11, a communication channel 12 for the time modulated signal provided by the modulator 11, and a demodulator 13 connected to the communication channel 12 for demodulating the communicated time modulated signal. In the illustrated embodiment of FIG. 1, the communication channel 12 includes a video tape recorder 15 since unwanted frequency components of the type here under consideration are particularly prevalent in video recording systems in which the frequency range of the information signal extends closely to the carrier frequency of the time modulation employed in conventional video recording systems.

At the present time two different kinds of time modulation are in use for video recording purposes; namely, frequency modulation on the one hand and pulse interval modulation according to my above-mentioned U.S. Pat. No. 3,319,013 on the other hand. However, my subject invention is not intended to be limited to any particular type of time modulation.

It should also be understood that the time modulator 11, the demodulator 13 and the video tape recorder 15 may all be of a conventional design.

The operation of the time modulation/demodulation system of FIG. 1 without the benefit of the subject invention will now be examined with the assistance of FIG. 2. To this end it is assumed that a modulating signal of a frequency of $f_m$, that is within the modulating signal frequency range $f_{mod}$, is applied to a modulating signal input 17 of the modulator 11 which effects a time modulation on a carrier of the $f_m$ signal at an average sampling rate of $f_s$ (see FIG. 2). The frequency of the carrier is typically equal to one-half $f_s$ or equal to $f_s$ itself.

The modulated signal is recorded on magnetic tape 18 by the tape recorder 15 for storage and subsequent playback. Upon playback, the reproduced modulated signal is applied to the demodulator 13 which demodulates the $f_m$ signal from the carrier and applies the same to a system output 20.

As is well known in the art of time modulation, the demodulator output signal at 20 will not only include the information signal $f_m$, but will also be contaminated with a component having a frequency of $f_s$, as well as sideband components having frequencies of $f_s \pm nf_m$, where $n$ represents integers. Of these the $f_s$ component, the upper sideband components, and the first-order lower sideband component are not generally detrimental, since they are all above the information signal frequency range $f_{mod}$ and can thus easily be eliminated by a low-pass filter 21 connected between the demodulator 13 and the systems output 20.

On the other hand, the second-order lower sideband $f_{-2}$, the third-order lower sideband $f_{-3}$, and the fourth-order lower sideband $f_{-4}$ are all potentially within the modulating system frequency range $f_{mod}$ and are thus not amenable to elimination by filtering. This may be expressed by saying that the unwanted components comprise frequencies equal to $f_s$ minus $nf_m$, where $n$ represents integers greater than one. The most serious of these components is typically the second-order lower sideband component $f_{-2}$ since it has the highest amplitude. An elimination of this component alone constitutes a major advance in the art.

According to the subject invention, the system of FIG. 1 includes a precorrection apparatus 25 which has an input 26 and an output 27. Information signals to be modulated and recorded are applied to a systems input 28. The input 26 of the precorrection apparatus 25 is connected to the systems input 28 so as to derive an operating signal from the input information signals.

For the present consideration it is assumed that an information signal of a frequency of $f_m$ is applied to the systems input 28. The precorrection apparatus 25 includes a nonlinear network 30, such as a diode device, for providing at the output 27 error signals of frequencies equal $2f_m$ and $3f_m$ (see FIG. 2). These error signals are combined with the information signal $f_m$.

To this end, the systems input terminal 28 is connected to a first input 32 of a conventional algebraic adding network 33. A delay line 34 is interposed between the input terminal 28 and the adding network input 32 to compensate for delays occurring in the precorrection apparatus 25.

The $2f_m$ and $3f_m$ error signals are applied to a second input 36 of the adding network 33 which is connected to the output 27 of the precorrection apparatus 25. The adding network 33 performs an algebraic combination of the error signals with the information signal. By way of example, the adding network 33 may be of a conventional type which performs a subtraction of error signals from the information signal if a mere addition should cause an enhancement, rather than a correction, of an unwanted component appearing at the systems output 20.

The combined information and error signals are applied to the modulating signal input 17 of the time modulator 11 to be jointly modulated on a carrier at an average sampling rate of $f_s$. The composite modulated signal is recorded on the magnetic recording tape 18 and is subsequently played back in to the demodulator 13 which demodulates these signals from their carrier.

The $2f_m$ and $3f_m$ error signals are eliminated by the low-pass filter 21. However, the $2f_m$ error signal has a first-order lower sideband component $2f_{m-1}$ of a frequency of $f_s-2f_m$ which corresponds to the frequency of the second-order lower sideband $f_{-2}$ of the information signal $f_m$. The $2f_m$ error signal also has a second-order lower sideband component $2f_{m-2}$ of a frequency of $f_s-4f_m$ which corresponds to the frequency of the fourth-order lower sideband $f_{-4}$ of the information signal $f_m$. The $3f_m$ error signal also has the potential of providing several sideband components. However, since it is typically of lower magnitude than the $2f_m$ error signal only the first-order sideband component $3f_{m-1}$ of the $3f_m$ error signal is here considered. The $3f_{m-1}$ sideband component provided by the $3f_m$ error signal has a frequency of $f_s-3f_m$ which corresponds to the third-order lower sideband component of the information signal $f_m$. As a matter of interest it will be noted from FIG. 2 that the fourth-order lower sideband component $f_{-4}$ of the $f_m$ information signal is closer to the second-order component $f_{-2}$ than the third-order sideband component $f_{-3}$, and is reversed in polarity. This reflects a conventional phenomenon in time modulation according to which a sideband component that would algebraically extend into the negative frequency domain is reflected at the 0-frequency axis to appear in the positive frequency domain with a reversed polarity. The same phenomenon operates on the $2f_{m-2}$ second-order component of the $2f_m$ error signal so as to bring that component at a reversed polarity into coincidence with the fourth-order $f_{-4}$ sideband component of the information signal $f_m$.

The operation of the equipment of the subject invention thus results in a reduction or elimination of various unwanted signal components before they can appear at the output of the demodulator 13. Since the magnitude of sideband components typically decreases with increasing sideband order, it is frequently sufficient in practice to correct only one unwanted sideband component. If we assume by way of example that only one component, such as the $f_{-2}$ component is to be eliminated, then we may state in general terms that the unwanted component to be precorrected has a frequency of $f_x$. In this case, the precorrection apparatus 25 is designed to provide at its output 27 an error signal having a frequency equal to $f_s$ minus $f_x$. The adding network 33 subtracts this $f_s$ minus $f_x$ signal from the information signal $f_m$ for a joint time modulation of the information signal and subtracted error signal by the modulator 11. Upon recording and subsequent playback, the error signal of a frequency $f_s$ minus $f_x$ provides a first-order lower sideband of a frequency of $f_s-(f_s-f_x)$, which amounts to $f_x$. Since the latter compensation component is of the same frequency as the $f_x$ component to be eliminated, and is moreover of an opposite polarity, it follows that an elimination or at least substantial reduction of the unwanted component takes place in the demodulator 13 itself.

In the example under consideration, the nonlinear network 30 may again include a diode device for providing the required error signals. For instance, if the $f_x$ unwanted component is the second-order lower sideband component $f_{-2}$ of the $f_m$ signal, then the nonlinear network 30 may include a diode device for generating the above-mentioned $2f_m$ and $3f_m$ signals and the apparatus 25 may include a filter 40 which is connected to the nonlinear network 30 and which is designed to pass the $2f_m$ error signal for a precorrection of the $f_x$ or $f_{-2}$ unwanted component, and to reject the $3f_m$ error signal.

In a typical case in which several unwanted sideband components are to be corrected in the demodulated $f_m$ signal, the filter 40 is preferably a high pass filter having a characteristic of the type shown by the dotted curve 42 in FIG. 2. As apparent from this dotted curve, the high pass filter 40 limits the error signals applied to the adding network input 36 to frequencies that are above one-half of the average sampling rate of $f_s$ for a precorrection of unwanted components that are below one-half of this average sampling rate. In this manner, any $f_m$ signal which is passed by the diode is not applied to adding network input 36.

The precorrection apparatus 25 may also include a compensating filter 44 connected between the high pass filter 40 and the correcting apparatus output 27. By way of example, the compensating filter 44 may be a band-pass or low-pass filter that rejects error signals of more than $3f_m$ if such error signals, if admitted to the time modulator 11, would overcorrect the fourth-order lower sideband components $f_{-4}$ of the $f_m$ signal. Such an overcorrection is easily possible in practice in cases where the $f_{-4}$ component is already corrected by the second-order lower sideband component $2f_{m-2}$ of the $2f_m$ error signal. The compensating filter 44 may also include a conventional phase-shifting network which ensures that the compensation component is of a polarity opposite to that of the unwanted component.

The function of the compensating filter 44 may be combined with that of the high pass filter 40. For instance, as the curve 42 in FIG. 2 indicates, the high-pass filter may have a declining characteristic as a function of frequency so as to diminish the amplitude of higher order error signals. $f_m$ A further tool for improving the performance of the illustrated embodiment resides in the signal shaping filter 46. As indicated by the dotted curve 48 in FIG. 2, the shaping filter may be a conventional low-pass filter having a gradual drop-off at upper frequencies of the modulating signal band $f_{mod}$. In this manner the amplitude of the operating signal for the precorrection apparatus 25 is varied as a function of the frequency of the information signal, whereby the amplitude of the error signals of $2f_m$ and $3f_m$ and their resulting sideband components are also varied as a function of frequency. It will, accordingly, be recognized that the high pass filter 40, compensating filter 44 and signal shaping filter 46 cooperate in improving the precorrection according to the subject invention over the entire frequency band of interest.

Figure 3:
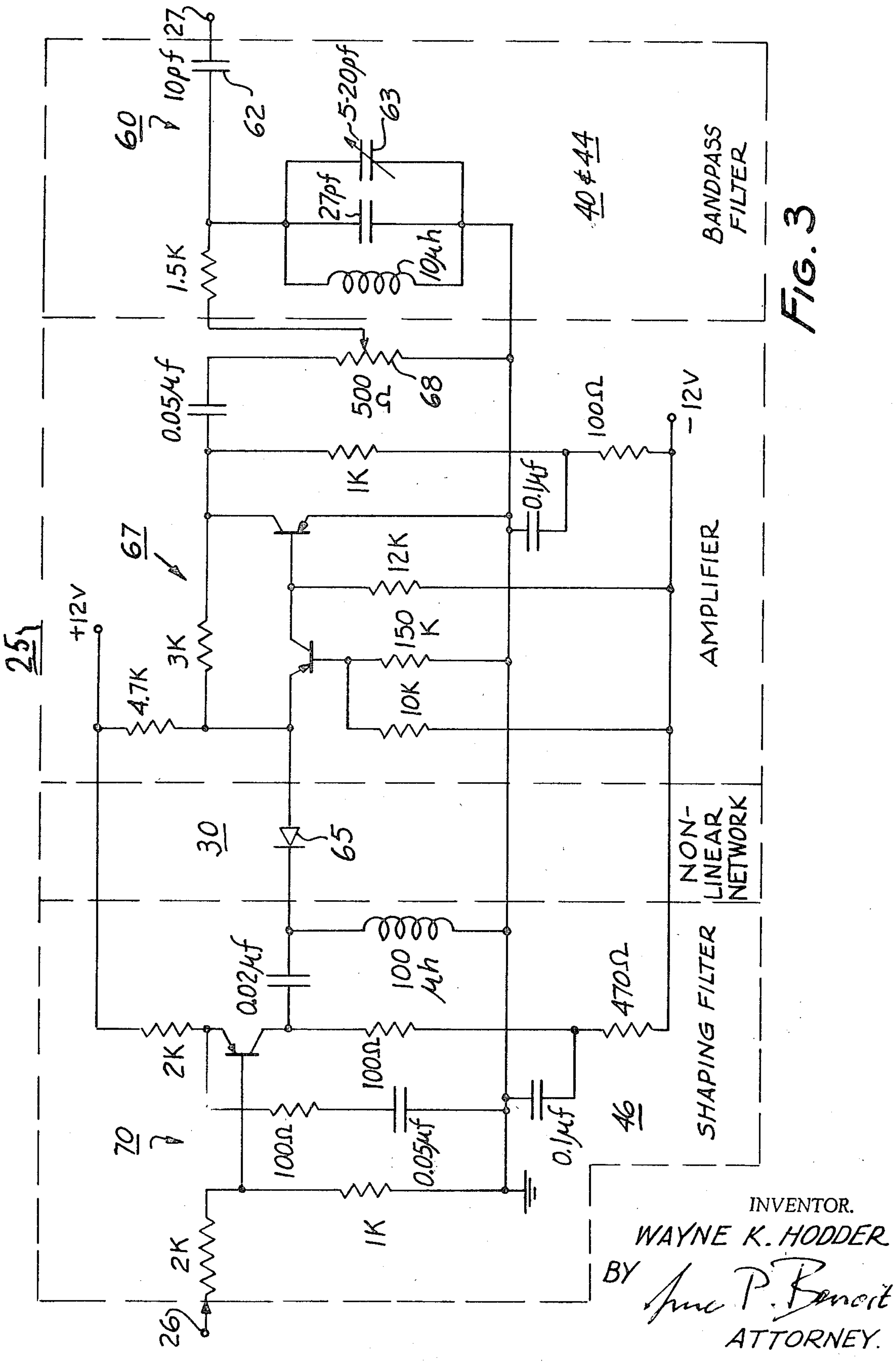
FIG. 3 is a circuit diagram of a preferred embodiment of the error correction system employed in the apparatus of FIG. 1.

A circuit diagram of a precorrection apparatus 25 in accordance with a preferred embodiment of the subject invention for use in the system of FIG. 1 is illustrated in FIG. 3. A detailed discussion of the composition of the various circuits is omitted in the interest of brevity, since each component is shown in the circuit diagram, together with its value and manner of connection.

The precorrection apparatus of FIG. 3 was built for a time-modulating system in a color video tape recorder operating at an average sampling rate of 12 MHz. The main unwanted component in that system was the second-order lower sideband of the color subcarrier, which produced more patterns in the played-back color video images. This unwanted component had a frequency of about 4.8 MHz. so that the error signal to be generated by the precorrection apparatus 25 and provided at the output 27 had to have a frequency of about 7.2 MHz. Accordingly, the high pass filter 40 and compensation filter 44 were combined in the form of a band-pass filter 60 that centered at approximately 8 MHz. This permitted a simple circuit design, and still provided sideband cancellations for a range of signal frequencies of up to 4.5 MHz. A band-pass filter also compares favorably to a high pass filter by a more linear relation of its phase shift versus frequency response. Since the delay line 34 (see FIG. 1) of the prototype under consideration had a linear phase characteristic, its phase shift can be made to track the phase shift of the band-pass filter 60 by fixing its delay to have its slope of phase shift versus frequency be equal to the average value of the filter over the frequency range of importance. In that case its value was approximately 0.125 microseconds, which is the value of the wavelength of the center frequency of the band-pass filter.

In addition to an identity of phase slope between the delay line 34 and the filters in the apparatus 25 it is also necessary that the phase angle difference between the signals applied respectively at the adding network inputs 32 and 36 have an appropriate value to effect cancellation of the particular unwanted component or components in the modulation/demodulation process. Initially the circuit values were chosen to make this phase angle difference 360°; that is, the delay line 34 had a 360° phase shift at center frequency of the filter 60, at which center frequency the phase shift is 0°. It was then found empirically that an additional 90° phase shift was required in the case of Pulse Interval Modulation, which was the type of time modulation employed in the prototype under consideration. The requisite 90° phase shift is provided by the capacitor 62 included in the filter 60 and connected to the output 27 of the precorrection apparatus 25. A variable capacitor 63 in the band-pass filter 60 permitted an adjustment of the center frequency of the band-pass filter.

The nonlinear network 30 of the apparatus of FIG. 3 was provided by a diode 65 which was connected to an amplifier 67 of a conventional design. The amplified error signals provided by the diode 65 and amplifier 67 are applied to a potentiometer 68 which permits adjustment of the proper amplitude level for cancellation of the unwanted component or components.

The shaping filter 46 employed in the apparatus of FIG. 3 is a high pass filter 70 that has a frequency break point of about 110 kHz. to remove most of the television luminance and synchronization energy from the operating signal derived from the composite video signal and applied to the diode 65 for generation of the desired error signal. The composite video signal itself is applied to the systems input 28.

Figure 4:
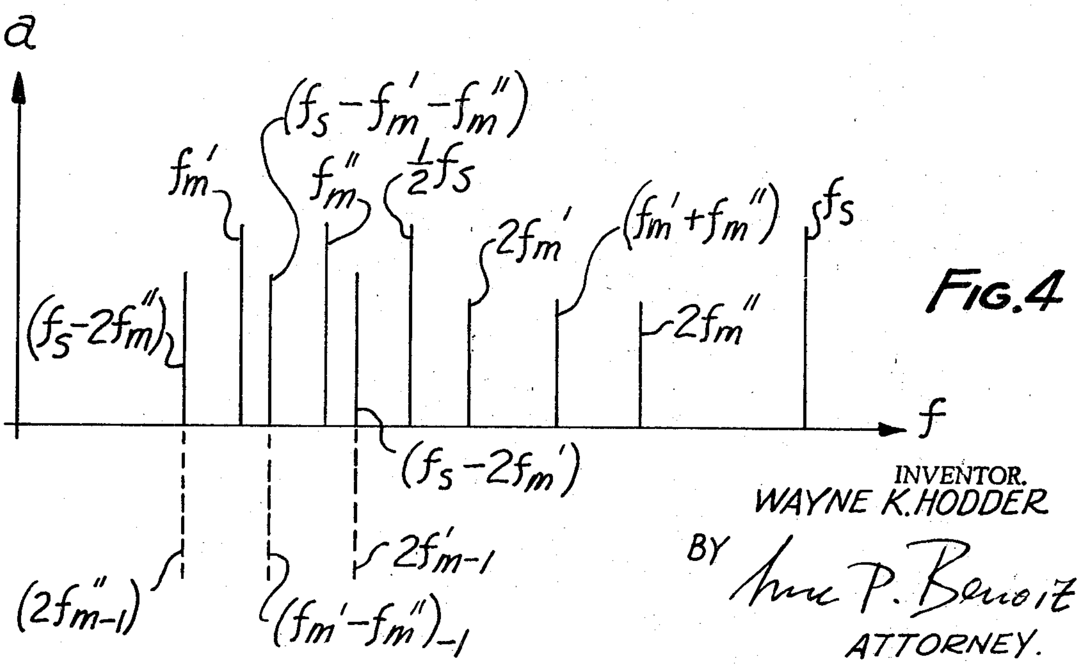
FIG. 4 is a second amplitude-versus-frequency plot illustrating a further facet of the operation of time modulation systems according to the subject invention.

It should be noted at this juncture that the subject invention is also applicable to systems in which the information signal comprises several simultaneously occurring frequency components. By way of example, FIG. 4 shows two information signals or information signal components which upon modulation and demodulation give rise to unwanted sideband components having mainly the frequencies of $(f_s-2f_m')$, $(f_s-2f_m'')$, and $(f_s-f_m'-f_m'')$, where $f_s$ is the average sampling frequency, $f_m'$ is the frequency of one of the information signal components, and $f_m''$ is the frequency of the other information signal component.

The information signal having the components of $f_m'$ and $f_m''$ is applied to the system input terminal 28 of the apparatus of FIG. 1. These signal components reach the adding network input 32 through the delay line 34. They also provide an operating signal for the precorrection apparatus 25 of FIG. 1 or 3 which by operation of the nonlinear network 30 or diode 65 provides an error signal having frequencies of $2f_m'$ and $2f_m''$, as well as $(f_m'+f_m'')$. In practice there will typically be more sideband components in the output signal of the demodulator 13 and more frequency components in the output signal of the nonlinear network 30. However, for the sake of simplicity and from the point of view of a correction of the more prominent unwanted components, only the frequency components shown in FIG. 4 are explicitly discussed.

The error signal frequency components are algebraically combined with the information signal components in the adding network 33 to be jointly subjected to a time modulating action in the modulator 11. Upon recording on the tape 18 and subsequent playback, the modulated signals are demodulated in the demodulator 13. During that process, the error signal component of $2f_m'$ provides a first-order lower sideband component of a frequency of $(f_s+2f_m')$ which coincides in frequency with, and is of a polarity opposite to the polarity of, the unwanted sideband component of $(f_s-2f_m')$ and which therefore eliminates that unwanted sideband component.

The same applies to the error signal component $2f_m''$, which provides a lower sideband component of $(f_s-2f_m'')$ that provides for an elimination of the unwanted $(f_s-2f_m'')$ component. Similarly, the unwanted component of $(f_s-f_m'-f_m'')$ is eliminated by a sideband component of a frequency of $(f_s-f_m'-f_m'')$ of the error signal component $(f_m'+f_m'')$.

In accordance with the principles of the subject invention, the illustrated unwanted sideband components are not actually permitted to occur in the demodulator output, and neither are the error signal sideband components. Rather the unwanted sideband components are precorrected when the error signal components are combined with the modulating signal components of $f_m'$ and $f_m''$. Also, the information signal frequencies of $f_m'$ and $f_m''$ may be fixed or may vary within a modulating signal frequency band.

It will now be recognized that the subject invention provides highly advanced signal precorrection equipment in the time modulation field, and particularly in that branch of this field which deals with broadband time modulation.

I claim:

1. Apparatus for time-modulating at an average sampling rate of $f_s$ an information signal which upon demodulation tends to be accompanied by an unwanted component of a frequency of $f_x$, comprising in combination:
first means for providing an error signal having a frequency of $f_s$ minus $f_x$;
second means connected to said first means for combining said error signal with said information signal; and
third means connected to said second means for time-modulating said combined error and information signals at said sampling rate whereby said error signal precorrects said unwanted component.

2. Apparatus as claimed in claim 1, wherein:
said first means include means for deriving said error signal from said information signal.

3. Apparatus as claimed in claim 1, wherein:
said first means include diode means for deriving said error signal from said information signal.

4. Apparatus as claimed in claim 1, wherein:
said frequency $f_x$ of said unwanted component is variable; and
said first means include means for limiting said error signal of $f_s$ minus $f_x$ to frequencies above one-half of said average sampling rate of $f_s$ for a precorrection of unwanted components below one-half of said average sampling rate.

5. Apparatus for time-modulating at an average sampling rate of $f_s$ an information signal having a frequency of $f_m$ which upon demodulation tends to be accompanied by unwanted components of frequencies equal to $f_s$ minus $nf_m$, where $n$ represents integers greater than one, comprising in combination:
first means for providing error signals having frequencies equal to $nf_m$;
second means connected to said first means for combining said error signals with said information signal; and
third means connected to said second means for time-modulating said combined error and information signals at said sampling rate whereby said error signals precorrect said unwanted components.

6. Apparatus as claimed in claim 5, wherein:
said first means include means for deriving said error signals from said information signal.

7. Apparatus as claimed in claim 5, wherein:
said first means include diode means for deriving said error signals from said information signal.

8. Apparatus as claimed in claim 5, wherein:
said first means include means for limiting said error signals to frequencies above one-half of said average sampling rate of $f_s$ for an at least partial precorrection of unwanted components having frequencies below one-half of said average sampling rate.

9. Apparatus for time-modulating at an average sampling frequency of $f_s$ an information signal including components of frequencies of $f_m'$ and $f_m''$ which upon demodulation tend to be accompanied by unwanted components of frequencies of $(f_s-2f_m')$, $(f_s-2f_m'')$ and $(f_s-f_m'-f_m'')$, comprising in combination:
first means for providing error signals having frequencies of $2f_m'$, $2f_m''$, and $(f_m'+f_m'')$;
second means connected to said first means for combining said error signals with said information signal including said $f_m'$ and $f_m''$ components; and
third means connected to said second means for time-modulating said combined error and information signals at said sampling rate whereby said error signals precorrect said unwanted components.

10. Apparatus as claimed in claim 9, wherein:
said first means include means for deriving said error signals from said information signal.

11. Apparatus as claimed in claim 9, wherein:
said first means include diode means for deriving said error signals from said information signal.

12. Apparatus as claimed in claim 9, wherein:
said first means include means for limiting said error signals to frequencies above one-half of said average sampling rate of $f_s$ for an at least partial precorrection of unwanted components having frequencies below one-half of said average sampling rate.

* * * * *

PO-1050
(5/69)

UNITED STATES PATENT OFFICE
CERTIFICATE OF CORRECTION

Patent No. 3,641,468 Dated Feb.8,1972

Inventor(s) Wayne K.Hodder

It is certified that error appears in the above-identified patent and that said Letters Patent are hereby corrected as shown below:

In the Title: "Time-Modulating Apparatus" should be --Time-Modulating Apparatus With Error Signal Precorrection--.
In the Abstract, Line 1 "with error precorrection" should be deleted.
Line 9, --signal-- should be inserted after "information".
Column 1, line 32, "broadband" should be --broad band--.
Column 4,line 2, "low-pass" should be --low pass--. Column 4,line 49, "in to" should be -- into--. Column 4,line 65, "3f $_m$" should be --3$f_m$--.

Column 4,line 75, "O-frequency" should be --zero frequency--.
Column 5,line 42, "high pass filter" should be --highpass filter--.
Also at Column 5,lines 44,52,67,68, and Column 6, lines 6,27,33 and 70.
Column 5,line 54, "band-pass or low-pass filter"should be --bandpass or lowpass filter--. Column 5,line 70, "higher order error signal $f_m$" should be --higher-order error signals--. Column 6,line 22, "subcarrier" should be -- sub-carrier--. Column 6,line 22, "more patterns" should be -- moiré patterns--. Column 6,line 28, "band-pass" should be --bandpass--. Also at Column 6,lines 31,37,42,60 and 61.
Column 6,line 42, "wavelength" should be -- wave length--.
Column 7,line 55, "broadband" should be -- broad-band--.
Column 8, line 11, "f $_x$" should be --$f_x$--.

Signed and sealed this 20th day of November 1973.

(SEAL)
Attest:

EDWARD M.FLETCHER,JR.
Attesting Officer

RENE D. TEGTMEYER
Acting Commissioner of Patents